Patented Aug. 25, 1936

2,052,138

UNITED STATES PATENT OFFICE

2,052,138

STABLE CARBAMIC ACID CHLORIDES

Heinrich Hopff and Helmut Ohlinger, Ludwigshafen-on-the-Rhine, Germany, assignors to I. G. Farbenindustrie Aktiengesellschaft, Frankfort-on-the-Main, Germany No Drawing. Application October 29, 1935, Serial No. 47,228. In Germany November 24, 1934

5 Claims. (Cl. 260—11)

The present invention relates to a method of preparing stable carbamic acid chlorides.

It is already known that carbamic acid chloride or its alkyl substitution products readily add on to aromatic hydrocarbons in the presence of catalysts of the Friedel-Crafts' type with the formation of carboxylic acid amides. The carbamic acid chlorides required for this reaction are very unstable, however, and rapidly decompose with the evolution of hydrogen chloride.

We have now found that carbamic acid chlorides, i. e. carbamic acid chloride itself or its alkyl or aryl substitution products can be stabilized for long periods without fear of decomposition by converting them into molecular compounds with halogen compounds of the type of Friedel-Crafts' catalysts, as for example anhydrous aluminium chloride, bromide or iodide, boron fluoride or anhydrous ferric chloride.

The preparation of the molecular compounds may be carried out for example by introducing the catalysts of the Friedel-Crafts' type in small batches into the liquid carbamic acid chlorides, the addition products usually being directly obtained in a solid form in which they may be stored for long periods without decomposition. In many cases it is preferable to employ inert solvents or diluents, such as carbon disulphide, dichlorbenzene, petroleum ether or benzene, during the preparation of the molecular compounds. Examples of carbamic acid chlorides suitable for the reaction are carbamic acid chloride, methylcarbamic acid chloride and phenylcarbamic acid chloride.

The following examples will further illustrate how our present invention may be carried out in practice but the invention is not restricted to these examples. The parts are by weight.

Example 1

200 parts of carbon disulphide are mixed with 79.5 parts of carbamic acid chloride and 133.5 parts of anhydrous aluminium chloride are then introduced in small portions while cooling and stirring vigorously. The carbon disulphide is then distilled off by gentle heating in vacuo. A white, readily pulverizable mass remains which can be stored for long periods without change.

Example 2

93.5 parts of methylcarbamic acid chloride are cooled and 133.5 parts of anhydrous aluminium chloride are added. A white powder is obtained which may be stored for long periods without change and which may be directly brought into reaction with aromatic hydrocarbons according to Friedel-Crafts' reaction.

What we claim is:—

1. The process for preparing stable carbamic acid chlorides which comprises combining them with halogen compounds of the type of Friedel-Crafts' catalysts.

2. The process for preparing stable carbamic acid chlorides which comprises combining them with halogen compounds of the type of Friedel-Crafts' catalysts in the presence of inert organic diluents.

3. Stabilized carbamic acid chlorides comprising compounds of carbamic acid chlorides and halogen compounds of the type of Friedel-Crafts' catalytsts.

4. Stabilized carbamic acid chloride comprising a compound of carbamic acid chloride and aluminium chloride.

5. Stabilized methylcarbamic acid chloride comprising the methylcarbamic acid chloride and aluminium chloride.

HEINRICH HOPFF.
HELMUT OHLINGER.